(12) United States Patent
Chang et al.

(10) Patent No.: US 11,558,111 B2
(45) Date of Patent: Jan. 17, 2023

(54) SATELLITE NETWORK COMMUNICATION WITH PROXY SERVICE APPARATUS FOR ACQUIRING TARGETED RESOURCES

(71) Applicant: ZTE CORPORATION, Shenzhen (CN)

(72) Inventors: Wei Chang, Shenzhen (CN); Wenbin Yan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 42 days.

(21) Appl. No.: 16/767,551

(22) PCT Filed: Nov. 23, 2018

(86) PCT No.: PCT/CN2018/117066
§ 371 (c)(1),
(2) Date: May 27, 2020

(87) PCT Pub. No.: WO2019/105286
PCT Pub. Date: Jun. 6, 2019

(65) Prior Publication Data
US 2021/0175963 A1 Jun. 10, 2021

(30) Foreign Application Priority Data

Nov. 30, 2017 (CN) .......................... 201711240121.3

(51) Int. Cl.
*H04B 7/185* (2006.01)

(52) U.S. Cl.
CPC ..... *H04B 7/18526* (2013.01); *H04B 7/18539* (2013.01); *H04B 7/18584* (2013.01)

(58) Field of Classification Search
CPC H04B 7/185; H04B 7/18526; H04B 7/18539; H04B 7/18584; H04B 7/18513;
(Continued)

(56) References Cited

U.S. PATENT DOCUMENTS

| 2005/0044242 | A1 | 2/2005 | Stevens et al. |
| 2011/0116373 | A1 | 5/2011 | Lauer |

(Continued)

FOREIGN PATENT DOCUMENTS

| CN | 1194512 A | 9/1998 |
| CN | 1230056 A | 9/1999 |

(Continued)

OTHER PUBLICATIONS

International Search Report for Application No. PCT/CN2018/117066, dated Jan. 30, 2019, 4 pages.

(Continued)

*Primary Examiner* — Philip Sobutka
(74) *Attorney, Agent, or Firm* — Morgan, Lewis & Bockius LLP

(57) ABSTRACT

Provided is a satellite network communication method. The method includes: establishing for a user equipment a satellite network communication channel between a proxy service apparatus on an end station side and a proxy service apparatus on a master station side; intercepting a resource access request sent by the UE; and when a target resource corresponding to the resource access request does not locally exist, acquiring the target resource through the satellite (Continued)

network communication channel and sending the target resource to the user equipment. Further provided are a proxy service apparatus and a gateway.

18 Claims, 6 Drawing Sheets

(58) Field of Classification Search
CPC ..... H04W 88/16; H04W 36/14; H04W 84/06; H04W 36/0055; H04W 40/02; H04W 40/24; H04L 29/06; H04L 29/08
See application file for complete search history.

(56) References Cited

U.S. PATENT DOCUMENTS

| | | | |
|---|---|---|---|
| 2013/0301521 A1 | 11/2013 | Abdi | |
| 2014/0341109 A1* | 11/2014 | Cartmell | H04L 43/50 370/328 |
| 2015/0172406 A1* | 6/2015 | Hansen | H04L 67/28 709/217 |

FOREIGN PATENT DOCUMENTS

| | | |
|---|---|---|
| CN | 1349173 A | 5/2002 |
| CN | 101494652 A | 7/2009 |
| CN | 103384967 A | 11/2013 |
| CN | 105897850 A | 8/2016 |
| CN | 107277647 A | 10/2017 |
| JP | 201449807 A | 3/2014 |

OTHER PUBLICATIONS

Chinese Office Action for Application No. 201711240121.3, dated Mar. 1, 2021, 21 pages including translation.
Chinese Office Action for Application No. 201711240121.3, dated Aug. 13, 2021, 26 pages including translation.
Japanese Office Action for Application No. 2020524475, dated Aug. 31, 2021, 10 pages including translation.
Japanese Office Action for Application No. 2020-524475, dated May 10, 2022, 11 pages including translation.

* cited by examiner

SATELLITE NETWORK COMMUNICATION WITH PROXY SERVICE APPARATUS FOR ACQUIRING TARGETED RESOURCES

CROSS-REFERENCE TO RELATED APPLICATIONS

This is a National Stage Application, filed under 35 U.S.C. 371, of International Patent Application No. PCT/CN2018/117066, filed on Nov. 23, 2018, which The present application claims the priority of Chinese patent application No. 201711240121.3 filed on Nov. 30, 2017, contents of both of which are incorporated herein by reference in their entireties.

TECHNICAL FIELD

The present disclosure relates to the field of satellite communication technologies, for example, to a satellite network communication method and a proxy service apparatus and a gateway.

BACKGROUND

Signals of a cellular mobile communication system cannot cover part of areas of offshore and land. A satellite communication as an effective supplementary means is widely used in these areas, especially in sectors of ocean transportation, drilling, surveying, fishery and so on. The satellite communication is not limited by factors such as time, place, environment and etc. It has many advantages such as a short opening time, a long transmission distance, a fast network deployment, and a communication distance unrelated to a communication cost, and a real-time bidirectional transmission of voice and data can be implemented.

As shown in FIG. 1, in a related satellite communication application scenario, after a user equipment (UE) accesses a satellite network through a gateway 1 (GW1), if the UE accesses public network resources through an air interface, the UE needs to use the transmission control protocol (TCP) and to establish a TCP channel to public network resources through a three-way handshake first, then to perform a corresponding resource transmission through Hyper Text Transfer Protocol (HTTP). A typically satellite communication has characteristics of large delay (for example, about 540 ms) and network instability, which will cause the TCP protocol to retransmit constantly, thereby causing a communication link congestion, wasting the satellite bandwidth, and affecting user Internet experience. Because the satellite bandwidth is expensive, this additional bandwidth waste will cause the user to face high Internet fees.

SUMMARY

Embodiments of the present disclosure provide a satellite network communication method, a proxy service apparatus and a gateway, which can save the satellite network communication bandwidth and improve the user online experience.

The present disclosure provides a satellite network communication method, applied to a proxy service apparatus on an end station side, the method includes steps described below.

A satellite network communication channel between the proxy service apparatus on the end station side and a proxy service apparatus on a master station side is established for a user equipment;

a resource access request sent by the user equipment is intercepted;

when a target resource corresponding to the resource access request does not locally exist, the target resource is acquired through the satellite network communication channel and sent to the user equipment.

The present disclosure provides a satellite network communication method, applied to a gateway on an end station side, the method includes steps described below.

An Internet protocol (IP) address is allocated to a user equipment when the user equipment accesses a satellite network communication system;

a proxy service apparatus on the end station side is notified of establishing for the user equipment a satellite network communication channel between the proxy service apparatus on the end station side and a proxy service apparatus on a master station side.

The present disclosure provides a satellite network communication method, applied to a proxy service apparatus on a master station side, the method includes steps described below.

A satellite network communication channel between a proxy service apparatus on an end station side and the proxy service apparatus on the master station side is established for a user equipment;

after receiving a resource access request sent by the proxy service apparatus on the end station side, a target resource corresponding to the resource access request is acquired; and the target resource is returned to the proxy service apparatus on the master station side through the satellite network communication channel.

The present disclosure provides a proxy service apparatus on an end station side, the apparatus includes a channel establishment and maintenance module, a message intercept module and a resource acquisition and processing module.

The channel establishment and maintenance module is configured to establish for a user equipment a satellite network communication channel between the proxy service apparatus on the end station side and a proxy service apparatus on a master station side;

the message intercept module is configured to intercept a resource access request sent by the user equipment; and the resource acquisition and processing module is configured to acquire a target resource through the satellite network communication channel and send the target resource to the user equipment, when the target resource corresponding to the resource access request does not locally exist.

The present disclosure provides a gateway on an end station side, the apparatus includes an address allocation module and a notification module.

The address allocation module is configured to allocate an Internet protocol (IP) address to a user equipment when the user equipment accesses a satellite network communication system; and the notification module is configured to notify a proxy service apparatus on the end station side of establishing for the user equipment a satellite network communication channel between the proxy service apparatus on the end station side and a proxy service apparatus on a master station side.

The present disclosure provides a proxy service apparatus on a master station side, the apparatus includes a channel establishment and maintenance module, a message receiving and processing module and a resource sending module.

The channel establishment and maintenance module is configured to establish for a user equipment a satellite network communication channel between a proxy service apparatus on an end station side and the proxy service apparatus on the master station side;

the message receiving and processing module is configured to acquire a target resource corresponding to a resource access request after receiving the resource access request sent by the proxy service apparatus on the end station side; and the resource sending module is configured to return the target resource to the proxy service apparatus on the master station side through the satellite network communication channel.

The present disclosure further provides a computer-readable storage medium which is configured to store a satellite network communication program, when the satellite network communication program is executed by a processor, implements the satellite network communication method applied to a proxy service apparatus on an end station side.

The present disclosure further provides a computer-readable storage medium which is configured to store a satellite network communication program, when the satellite network communication program is executed by a processor, implements the satellite network communication method applied to a gateway on an end station side.

The present disclosure further provides a computer-readable storage medium which is configured to store a satellite network communication program, when the satellite network communication program is executed by a processor, implements the satellite network communication method applied to a proxy service apparatus on a master station side.

DETAILED DESCRIPTION

In the existing art, since a TCP connection is established each time when a user initiates an HTTP request, a large number of TCP connection establishment and retransmission behaviors will cause a communication link congestion and a waste of the satellite bandwidth, and affect the user Internet experience. Therefore, the embodiments of the present disclosure deploy proxy service apparatuses on an end station side and a master station side respectively, and all resource access requests (such as an HTTP request) initiated by user equipments are transmitted by using a channel established between these two proxy service apparatuses, which can spare bandwidth resources consumed during a TCP connection establishment process of each resource access request and improve the user Internet experience.

Embodiment One

Figure 1:
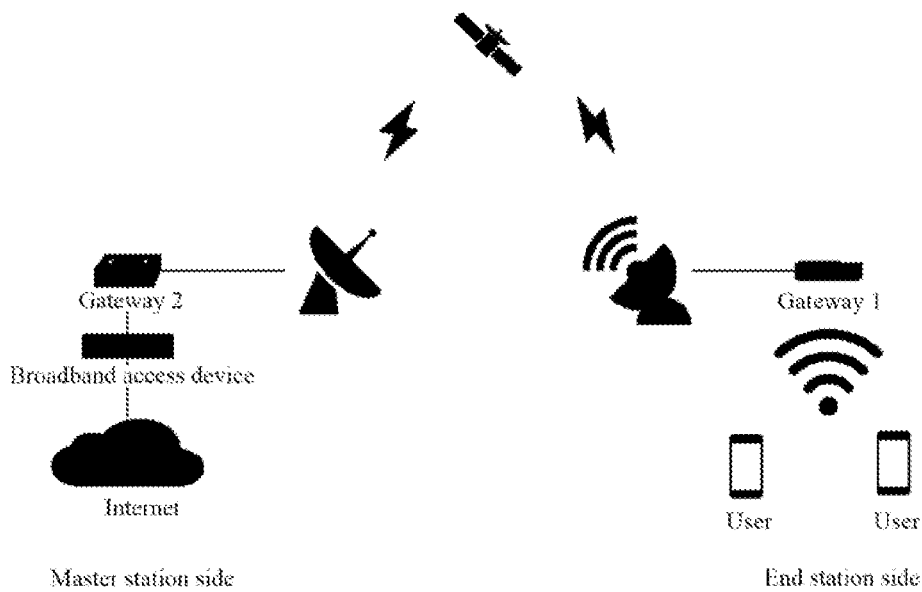
FIG. 1 is a schematic diagram for a satellite communication scenario in the existing art.
Figure 2:
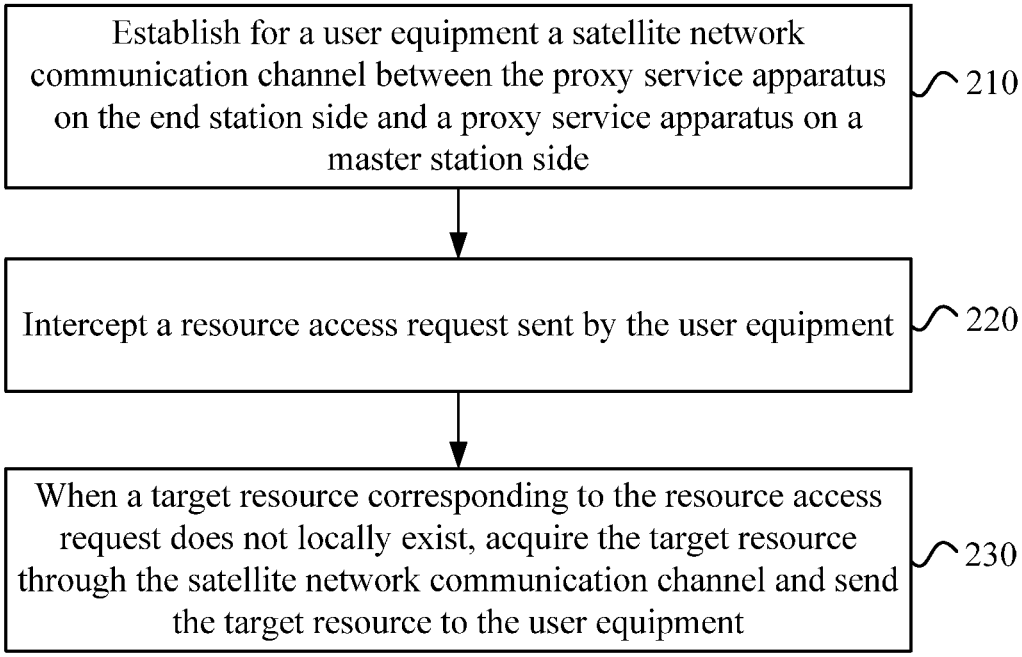
FIG. 2 is a flowchart of a satellite network communication method applied to a proxy service apparatus on an end station side according to an embodiment of the present disclosure.

As shown in FIG. 2, an embodiment of the present disclosure provides a satellite network communication method, applied to a proxy service apparatus on an end station side, the method includes steps described below.

Step 210, a satellite network communication channel between the proxy service apparatus on the end station side and a proxy service apparatus on a master station side is established for a user equipment.

Step 220, a resource access request sent by the user equipment is intercepted.

Step 230, when a target resource corresponding to the resource access request does not locally exist, the target resource is acquired through the satellite network communication channel and sent to the user equipment.

In this embodiment, an end station refers to a ship-mounted mobile device or a vehicle-mounted mobile device in a satellite network communication system, and the end station is configured to provide Internet services for user equipments. A master station refers to a ground station device in the satellite network communication system and is configured to connect to a website server device providing resources on the Internet.

In an embodiment, the proxy service apparatus on the end station side is a separate server device, or is integrated in a gateway on the end station side; and the proxy service apparatus on the master station side is a separate server device, or is integrated in a gateway on the master station side.

In an embodiment, after the resource access request sent by the user equipment is intercepted, it is determined whether the target resource corresponding to the resource access request locally exists, if a determination result is no, then the target resource corresponding to the resource access request does not locally exist; and if the determination result is yes, then the target resource corresponding to the resource access request locally exists.

In an embodiment, the method further includes a step described below.

If the target resource corresponding to the resource access request locally exists, the target resource stored locally is returned to the user equipment.

In an embodiment, the step in which the satellite network communication channel between the proxy service apparatus on the end station side and the proxy service apparatus on the master station side is established for the user equipment includes one of steps described below.

If the gateway on the end station side accesses a satellite network communication system, the satellite network communication channel between the proxy service apparatus on the end station side and the proxy service apparatus on the master station side is established for the user equipment according to an indication of the gateway on the end station side, where the satellite network communication channel is able to be shared by multiple user equipments connected to the gateway on the end station side; and if the user equipment accesses a satellite network communication system through the gateway on the end station side, the satellite network communication channel between the proxy service apparatus on the end station side and the proxy service apparatus on the master station side is established for the user equipment according to the indication of the gateway on the end station side.

In an embodiment, after the satellite network communication channel between the proxy service apparatus on the end station side and the proxy service apparatus on the master station side is established for the user equipment, the method further includes a step described below.

A correspondence between an identifier of the satellite network communication channel and an identifier of the user equipment is established.

The satellite network communication channel includes: a TCP socket channel or a stream control transmission protocol (SCTP) socket channel.

Where, the identifier of the satellite network communication channel includes: a socket identifier (ID); and the identifier of the user equipment includes: an IP address of a user.

In an embodiment, the method further includes a step described below.

If the user equipment leaves the satellite network communication system, the satellite network communication channel between the proxy service apparatus on the end station side and the proxy service apparatus on the master station side established for the user equipment is deleted according to an indication of the gateway on the end station side.

In an embodiment, the step in which the target resource is acquired through the satellite network communication channel and sent to the user equipment includes steps described below.

The target resource is requested from the proxy service apparatus on the master station side through the satellite network communication channel; and
after receiving the target resource returned by the proxy service apparatus on the master station side, the target resource is sent to the user equipment.

In an embodiment, the method further includes steps described below.
after receiving a resource synchronized by the proxy service apparatus on the master station side through a forward broadcast, the resource is locally stored; and/or after receiving a target resource corresponding to any resource access request returned by the proxy service apparatus on the master station side, the target resource is locally stored.

Embodiment Two

Figure 3:
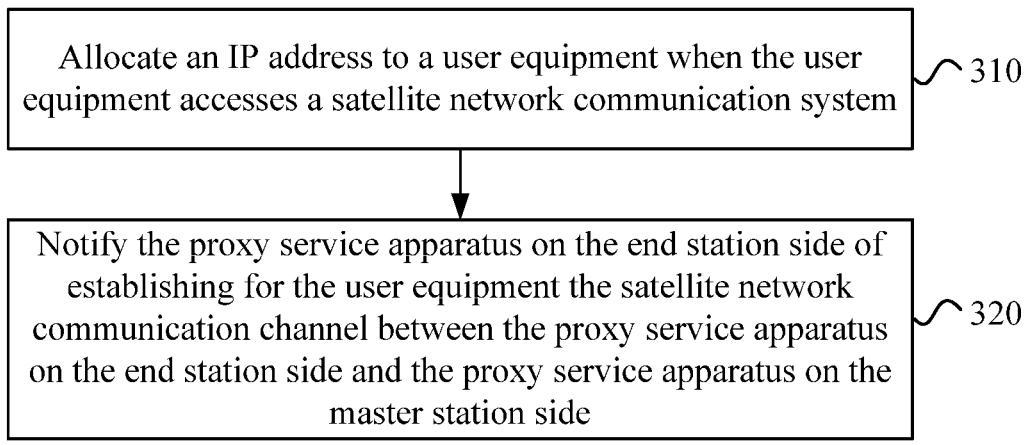
FIG. 3 is a flowchart of a satellite network communication method applied to a gateway on an end station side according to an embodiment of the present disclosure.

As shown in FIG. 3, an embodiment of the present disclosure provides a satellite network communication method, applied to a gateway on an end station side, the method includes steps described below.

Step 310, an IP address is allocated to a user equipment when the user equipment accesses a satellite network communication system.

Step 320, a proxy service apparatus on the end station side is notified of establishing for the user equipment the satellite network communication channel between the proxy service apparatus on the end station side and the proxy service apparatus on the master station side.

In this embodiment, the end station refers to a ship-mounted mobile device or a vehicle-mounted mobile device in the satellite network communication system, and the end station is configured to provide Internet services for user equipments. The master station refers to a ground station device in the satellite network communication system and is configured to connect to a website server device providing resources on the Internet.

In an embodiment, the proxy service apparatus on the end station side is a separate server device, or is integrated in the gateway on the end station side; and the proxy service apparatus on the master station side is a separate server device, or is integrated in a gateway on the master station side.

In an embodiment, the step in which the proxy service apparatus on the end station side is notified of establishing for the user equipment the satellite network communication channel between the proxy service apparatus on the end station side and the proxy service apparatus on the master station side includes one of steps described below.

After it is detected that this device (i.e., the gateway on the end station side) accesses the satellite network communication system, a channel establishment notification message is sent to the proxy service apparatus on the master station side to indicate the proxy service apparatus on the end station side to establish the satellite network communication channel between the proxy service apparatus on the end station side and the proxy service apparatus on the master station side, where the satellite network communication channel is able to be shared by multiple user equipments connected to the gateway on the end station side; after it is detected that the user equipment accesses the satellite network communication system, the channel establishment notification message is sent to the proxy service apparatus on the master station side to indicate the proxy service apparatus on the end station side to establish for the user equipment the satellite network communication channel between the proxy service apparatus on the end station side and the proxy service apparatus on the master station side.

In an embodiment, the method further includes a step described below.

After it is detected that the user equipment leaves the satellite network communication system, a channel deletion notification message is sent to the proxy service apparatus on the master station side to indicate the proxy service apparatus on the end station side to delete the satellite network communication channel between the proxy service apparatus on the end station side and the proxy service apparatus on the master station side established for the user equipment.

Embodiment Three

Figure 4:
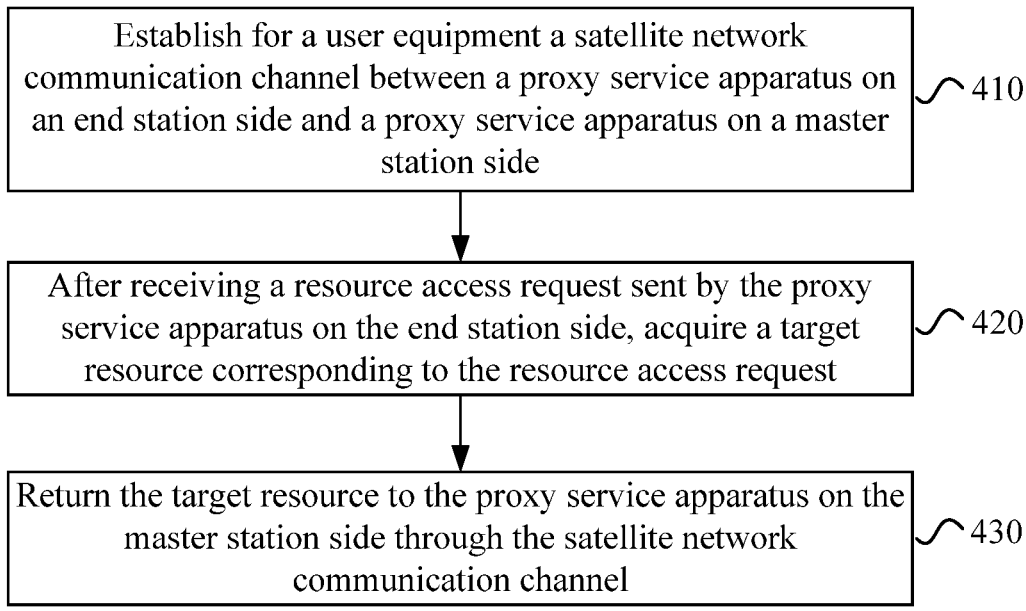
FIG. 4 is a flowchart of a satellite network communication method applied to a proxy service apparatus on a master station side according to an embodiment of the present disclosure.

As shown in FIG. 4, an embodiment of the present disclosure provides a satellite network communication method, applied to a proxy service apparatus on a master station side, the method includes steps described below.

Step 410, a satellite network communication channel between a proxy service apparatus on an end station side and the proxy service apparatus on the master station side is established for a user equipment.

Step 420, after receiving a resource access request sent by the proxy service apparatus on the end station side, a target resource corresponding to the resource access request is acquired.

Step 430, the target resource is returned to the proxy service apparatus on the master station side through the satellite network communication channel.

In this embodiment, the end station refers to a ship-mounted mobile device or a vehicle-mounted mobile device in the satellite network communication system, and the end station is configured to provide Internet services for the user equipment. The master station refers to a ground station device in the satellite network communication system and is configured to connect to a website server device providing resources on the Internet.

In an embodiment, the proxy service apparatus on the end station side is a separate server device, or is integrated in a gateway on an end station side; and the proxy service apparatus on the master station side is a separate server device, or is integrated in a gateway on the master station side.

In an embodiment, the step in which the target resource corresponding to the resource access request is acquired includes steps described below.

It is determined whether the target resource corresponding to the resource access request locally exists;
if the target resource corresponding to the resource access request locally exists, the target resource is locally acquired; or
if the target resource corresponding to the resource access request does not locally exist, the target resource is acquired from a target website.

In an embodiment, after the target resource is acquired from the target website, the method further includes a step described below.

The target resource is locally stored.

In an embodiment, the method further includes steps described below.

A hotspot resource is acquired periodically and the hotspot resource is locally stored.

In an embodiment, the method further includes a step described below.

The hotspot resource is pushed to the proxy service apparatus on the end station side by using a satellite forward broadcast.

In an embodiment, the step in which the target resource is returned to the proxy service apparatus on the master station side through the satellite network communication channel includes a step described below.

The target resource is compressed according to a configuration of the proxy service apparatus on the master station side.

In an embodiment, the step in which the target resource is returned to the proxy service apparatus on the master station side through the satellite network communication channel includes a step described below.

The target resource is not compressed according to the configuration of the proxy service apparatus on the master station side.

Embodiment Four

Figure 5:
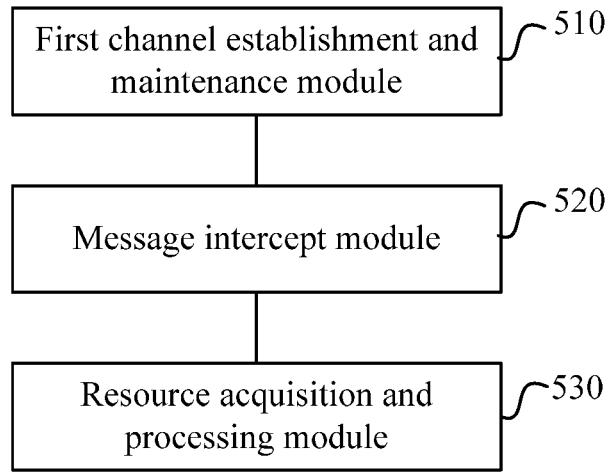
FIG. 5 is a schematic diagram of a proxy service apparatus on an end station side according to an embodiment of the present disclosure.

As shown in FIG. 5, an embodiment of the present disclosure provides a proxy service apparatus on an end station side, the proxy service apparatus includes a first channel establishment and maintenance module 510, a message intercept module 520 and a resource acquisition and processing module 530.

The first channel establishment and maintenance module 510 is configured to establish for a user equipment a satellite network communication channel between the proxy service apparatus on the end station side and a proxy service apparatus on a master station side;
the message intercept module 520 is configured to intercept a resource access request sent by the user equipment; and
the resource acquisition and processing module 530 is configured to acquire a target resource through the satellite network communication channel and send the target resource to the user equipment, if the target resource corresponding to the resource access request does not locally exists.

In this embodiment, the end station refers to a ship-mounted mobile device or a vehicle-mounted mobile device in the satellite network communication system, and the end station is configured to provide Internet services for the user equipment. The master station refers to a ground station device in the satellite network communication system and is configured to connect to a website server device providing resources on the Internet.

In an embodiment, the proxy service apparatus on the end station side is a separate server device, or is integrated in a gateway on the end station side; and the proxy service apparatus on the master station side is a separate server device, or is integrated in a gateway on the master station side.

In an embodiment, the resource acquisition and processing module 530 is further configured to return to the user equipment the target resource stored locally, if the target resource corresponding to the resource access request locally exists.

In an embodiment, the first channel establishment and maintenance module 510 is configured to establish for the user equipment the satellite network communication channel between the proxy service apparatus on the end station side and the proxy service apparatus on the master station side in following manners:
when a gateway on the end station side accesses a satellite network communication system, the satellite network communication channel between the proxy service apparatus on the end station side and the proxy service apparatus on the master station side is established for the user equipment according to an indication of the gateway on the end station side, where the satellite network communication channel is able to be shared by multiple user equipments connected to the gateway on the end station side; and
when the user equipment accesses a satellite network communication system through the gateway on the end station side, the satellite network communication channel between the proxy service apparatus on the end station side and the proxy service apparatus on the master station side is established for the user equipment according to the indication of the gateway on the end station side.

In an embodiment, the first channel establishment and maintenance module 510 is further configured to establish a correspondence between an identifier of the satellite network communication channel and an identifier of the user equipment, after the satellite network communication channel between the proxy service apparatus on the end station side and the proxy service apparatus on the master station side is established for the user equipment.

The satellite network communication channel includes: a TCP socket channel or an SCTP socket channel.

Where, the identifier of the satellite network communication channel includes: a socket identifier (ID); and the identifier of the user equipment includes: an IP address of a user.

In an embodiment, the first channel establishment and maintenance module 510 is configured to delete the satellite network communication channel between the proxy service apparatus on the end station side and the proxy service apparatus on the master station side established for the user equipment according to the indication of the gateway on the end station side, when the user equipment leaves the satellite network communication system.

In an embodiment, the resource acquisition and processing module 530 is configured to acquire the target resource through the satellite network communication channel and send to the user equipment in following manners:
the target resource is requested from the proxy service apparatus on the master station side through the satellite network communication channel; and
after receiving the target resource returned by the proxy service apparatus on the master station side, the target resource is sent to the user equipment.

In an embodiment, the resource acquisition and processing module 530 is further configured to at least one of:
after receiving a resource synchronized by the proxy service apparatus on the master station side through forward broadcast, store the resource locally; and
after receiving a target resource corresponding to any resource access request returned by the proxy service apparatus on the master station side, store the target resource locally.

Embodiment Five

Figure 6:
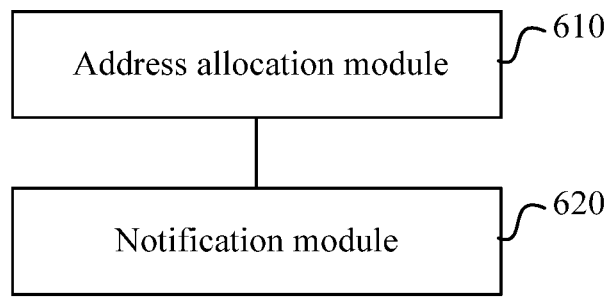
FIG. 6 is a schematic diagram of a gateway on an end station side according to an embodiment of the present disclosure.

As shown in FIG. 6, an embodiment of the present disclosure provides a gateway on an end station side, the gateway includes an address allocation module 610 and a notification module 620.

The address allocation module 610 is configured to allocate an IP address to a user equipment when the user equipment accesses a satellite network communication system; and
the notification module 620 is configured to notify a proxy service apparatus on the end station side of establishing for the user equipment the satellite network communication channel between the proxy service apparatus on the end station side and the proxy service apparatus on the master station side.

In this embodiment, the end station refers to a ship-mounted mobile device or a vehicle-mounted mobile device in the satellite network communication system, and the end station is configured to provide Internet services for the user equipment. The master station refers to a ground station device in the satellite network communication system and is configured to connect to a website server device providing resources on the Internet.

In an embodiment, the proxy service apparatus on the end station side is a separate server device, or is integrated in the gateway on the end station side; and the proxy service apparatus on the master station side is a separate server device, or is integrated in a gateway on the master station side.

In an embodiment, the notification module 620 is configured to notify the proxy service apparatus on the end station side of establishing for the user equipment the satellite network communication channel between the proxy service apparatus on the end station side and the proxy service apparatus on the master station side in following manners:
after it is detected that the gateway on the end station side accesses the satellite network communication system, a channel establishment notification message is sent to the proxy service apparatus on the master station side to indicate the proxy service apparatus on the end station side to establish the satellite network communication channel between the proxy service apparatus on the end station side and the proxy service apparatus on the master station side, where the satellite network communication channel is able to be shared by multiple user equipments connected to the gateway on the end station side; and
after it is detected that the user equipment accesses the satellite network communication system, the channel establishment notification message is sent to the proxy service apparatus on the master station side to indicate the proxy service apparatus on the end station side to establish for the user equipment the satellite network communication channel between the proxy service apparatus on the end station side and the proxy service apparatus on the master station side.

In an embodiment, the notification module 620 is further configured to: after it is detected that the user equipment leaves the satellite network communication system, send a channel deletion notification message to the proxy service apparatus on the master station side to indicate the proxy service apparatus on the end station side to delete the satellite network communication channel between the proxy service apparatus on the end station side and the proxy service apparatus on the master station side established for the user equipment.

Embodiment Six

Figure 7:
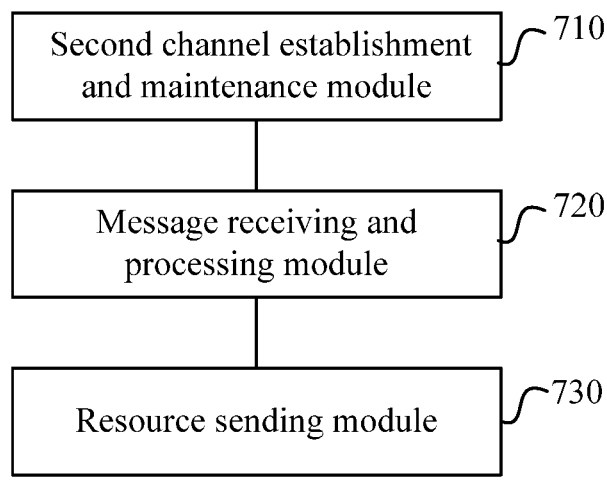
FIG. 7 is a schematic diagram of a proxy service apparatus on a master station side according to an embodiment of the present disclosure.

As shown in FIG. 7, an embodiment of the present disclosure provides a proxy service apparatus on a master station side, the proxy service apparatus includes a second channel establishment and maintenance module 710, a message receiving and processing module 720 and a resource sending module 730.

The second channel establishment and maintenance module 710 is configured to establish for a user equipment a satellite network communication channel between a proxy service apparatus on an end station side and the proxy service apparatus on the master station side;
the message receiving and processing module 720 is configured to: after receiving a resource access request sent by the proxy service apparatus on the end station side, acquire a target resource corresponding to the resource access request; and
the resource sending module 730 is configured to return the target resource to the proxy service apparatus on the master station side through the satellite network communication channel.

In this embodiment, the end station refers to a ship-mounted mobile device or a vehicle-mounted mobile device in the satellite network communication system, and the end station is configured to provide Internet services for the user equipment. The master station refers to a ground station device in the satellite network communication system and is configured to connect to a website server device providing resources on the Internet.

In an embodiment, the proxy service apparatus on the end station side is a separate server device, or is integrated in a gateway on the end station side; and the proxy service apparatus on the master station side is a separate server device, or is integrated in a gateway on the master station side.

In an embodiment, the message receiving and processing module 720 is configured to:
determine whether the target resource corresponding to the resource access request locally exists; and
if the target resource corresponding to the resource access request locally exists, acquire the target resource locally; or
if the target resource corresponding to the resource access request does not locally exist, acquire the target resource from a target website.

In an embodiment, the message receiving and processing module 720 is further configured to: after acquiring the target resource from the target website, store the target resource locally.

In an embodiment, the message receiving and processing module 720 is further configured to acquire a hotspot resource periodically and store the hotspot resource locally.

In an embodiment, the resource sending module 730 is further configured to push the hotspot resource to the proxy service apparatus on the end station side by using a satellite forward broadcast.

In an embodiment, the step in which the target resource is returned to the proxy service apparatus on the master station side through the satellite network communication channel includes a step described below.

The target resource is compressed according to a configuration of the proxy service apparatus on the master station side.

In an embodiment, the step in which the target resource is returned to the proxy service apparatus on the master station side through the satellite network communication channel includes a step described below.

The target resource is not compressed according to the configuration of the proxy service apparatus on the master station side.

Embodiment Seven

An embodiment of the present disclosure provides a proxy service apparatus on an end station side, the proxy service apparatus includes a memory, a processor and a satellite network communication program stored in the memory and executable by the processor, when the satellite network communication program is executed by the processor, implements the satellite network communication method according to embodiment one.

Embodiment Eight

An embodiment of the present disclosure provides a gateway on an end station side, the gateway includes a memory, a processor and a satellite network communication program stored in the memory and executable by the processor, when the satellite network communication program is executed by the processor, implements the satellite network communication method according to embodiment two.

Embodiment Nine

An embodiment of the present disclosure provides a proxy service apparatus on a master station side, the proxy service apparatus includes a memory, a processor and a satellite network communication program stored in the memory and executable by the processor, when the satellite network communication program is executed by the processor, implements the satellite network communication method according to embodiment three.

Embodiment Ten

An embodiment of the present disclosure provides a computer-readable storage medium, which is configured to store a satellite network communication program, when the satellite network communication program is executed by a processor, implements the satellite network communication method according to the embodiment one.

Embodiment Eleven

An embodiment of the present disclosure provides a computer-readable storage medium, which is configured to store a satellite network communication program, when the satellite network communication program is executed by a processor, implements the satellite network communication method according to the embodiment two.

Embodiment Twelve

The embodiment of the present disclosure provides a computer-readable storage medium, which is configured to store a satellite network communication program, when the satellite network communication program is executed by a processor, implements the satellite network communication method according to the embodiment three.

The communication methods of the embodiments of the present application are further described below using some examples.

Example One

Figure 8:
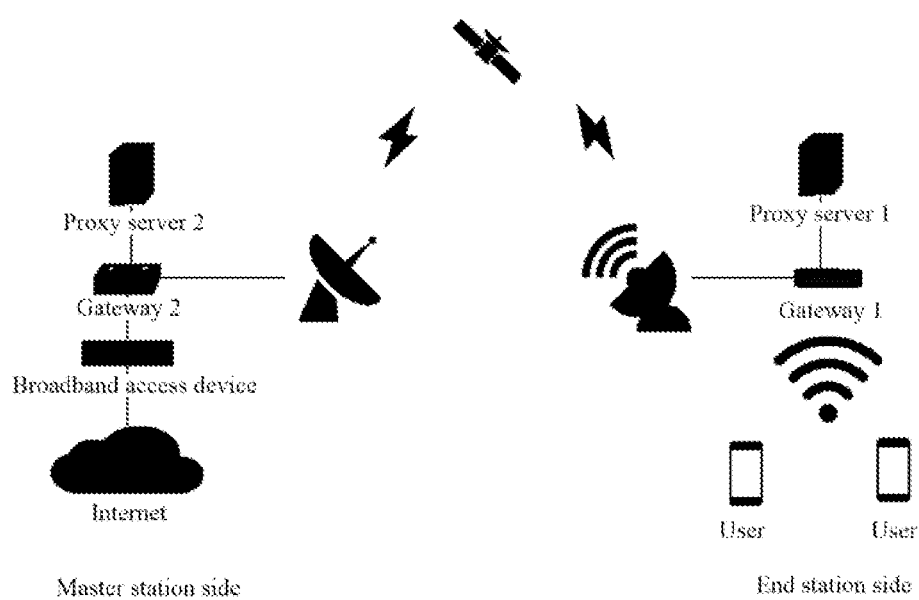
FIG. 8 is a schematic diagram of a satellite communication scenario in embodiment one of the present disclosure.

As shown in FIG. 8, in this example, an end station side deploys a proxy server on the end station side (proxy server 1) and a gateway on the end station side (GW1, i.e., gateway 1), and a master station side deploys a proxy server on the master station side (proxy server 2) and a gateway on the master station side (GW2, i.e., gateway 2), proxy server 1 and proxy server 2 use a TCP socket channel to transfer user data. The end station refers to a ship-mounted mobile device or a vehicle-mounted mobile device in the satellite communication system, and the end station is configured to provide Internet services for user equipments. The master station refers to a ground station device in the satellite communication system and is configured to connect to a website server device providing resources on the Internet.

The user equipment accesses the system, gateway 1 (GW1) allocates an IP address to the user equipment through the dynamic host configuration protocol (DHCP). Gateway 1 notifies proxy server 1 of new user access, and proxy server 1 establishes a TCP socket channel with proxy server 2, and simultaneously records a correspondence between an IP of a user and a socket ID of the channel.

Figure 12:
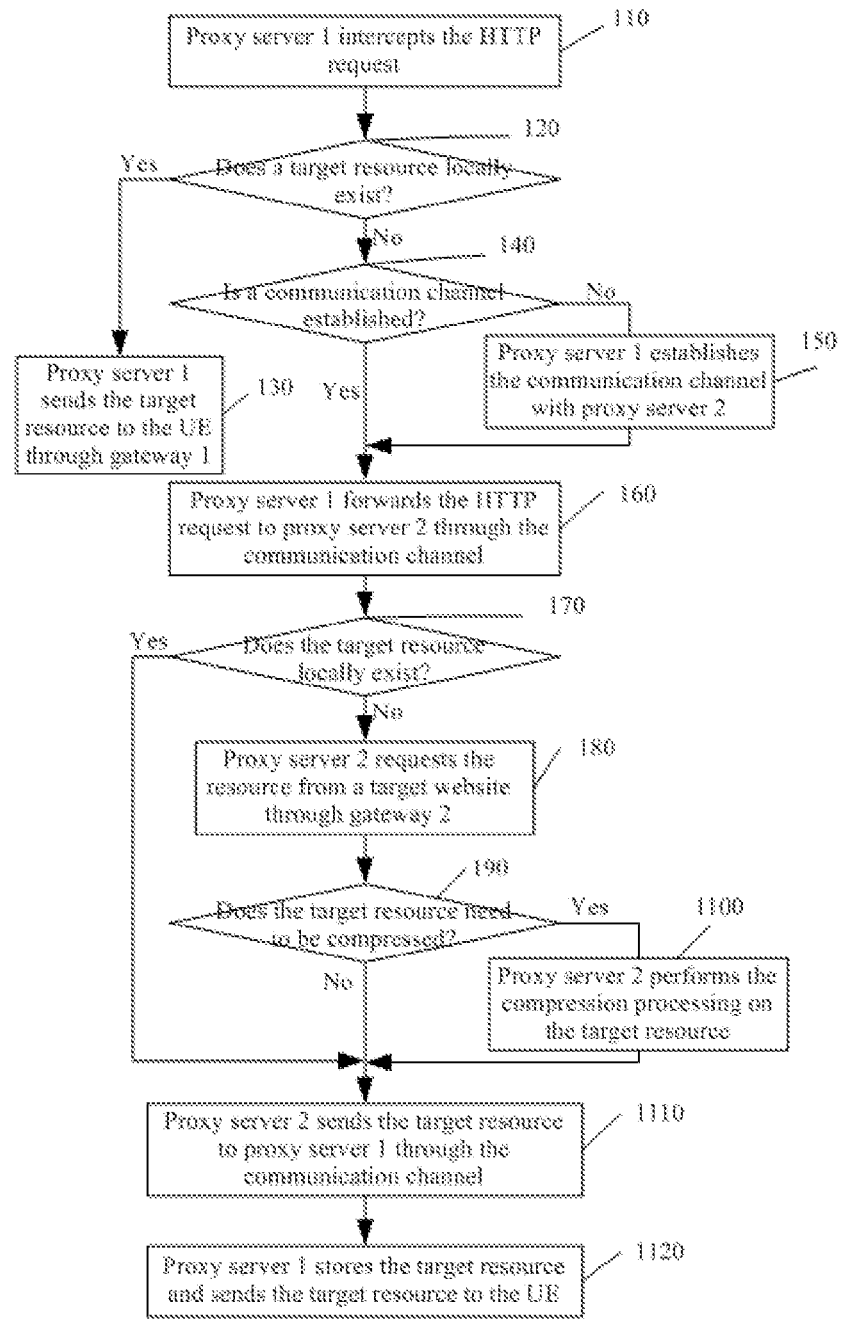
FIG. 12 is a flowchart of a communication method in embodiment one of the present disclosure.

As shown in FIG. 12, the user equipment sends an HTTP request, and the communication method of this example may include steps described below.

Step 110, the UE sends the HTTP request, and proxy server 1 intercepts the HTTP request and parses contents of the HTTP request.

Step 120, proxy server 1 searches a local cache to determine whether the requested resource locally exists. If it exists, step 130 is executed; otherwise, step 140 is executed.

Step 130, proxy server 1 returns a local resource to the UE, and this process ends.

Step 140, proxy server 1 determines whether a communication channel (a socket channel) corresponding to the user is established according to the IP of the user carried in a message of the HTTP request. If it is not established, step 150 is executed; otherwise, step 160 is executed.

Step 150, proxy server 1 establishes the TCP socket channel with the proxy server 2, and simultaneously records the correspondence between the IP of the user and the socket ID of the channel.

Step 160, proxy server 1 forwards the HTTP request of the UE to proxy server 2 through the established socket channel.

Step 170, after receives the HTTP request, proxy server 2 searches a local cache to determine whether the requested resource locally exists. If it exists, step 1110 is executed; otherwise, step 180 is executed.

Step 180, proxy server 2 requests the resource from a target website through gateway 2 (GW2) according to the HTTP request.

Step 190, after receives the resource returned by the target website, proxy server 2 determines whether to perform a compression processing on the resource according to a user configuration. If the compression processing is performed on the resource, step 1100 is executed; otherwise, step 1120 is executed.

Step 1100, proxy server 2 performs the compression processing on the resource and then step 1110 is executed.

Step 1110: proxy server 2 forwards the resource to proxy server 1 through the established socket channel.

Step 1120, the proxy server 1 stores the resource locally and sends the resource to the user equipment.

In an embodiment, when the user equipment leaves the system, gateway 1 notifies proxy server 1 of deleting the socket channel corresponding to the user equipment. In other embodiments, if multiple user equipments share one socket channel, a user equipment leaves the system may not trigger gateway 1 to notify proxy server 1 of deleting the socket channel.

Example Two

Figure 9:
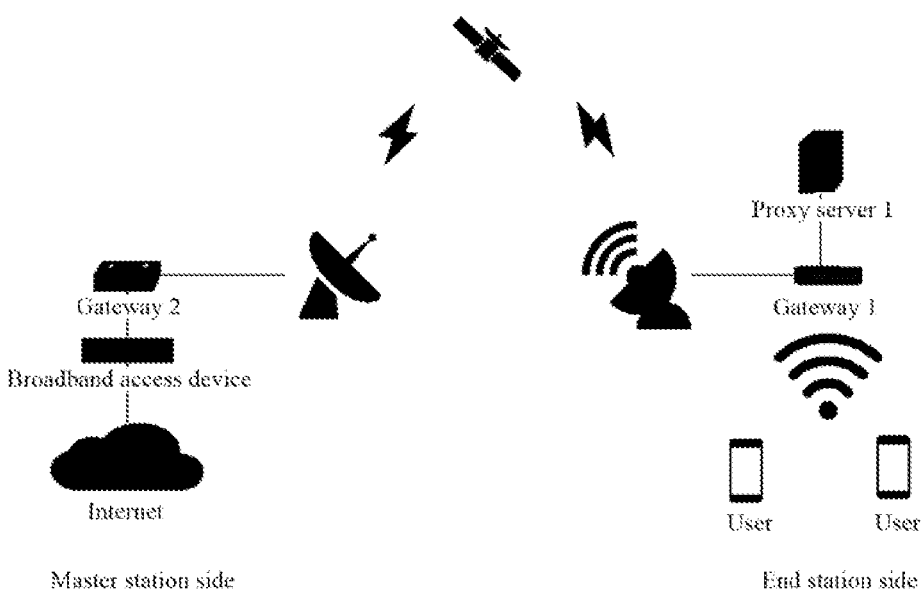
FIG. 9 is a schematic diagram of a satellite communication scenario in embodiment two of the present disclosure.

As shown in FIG. 9, in this example, the end station side deploys a gateway on the end station side (GW1, i.e., gateway 1) and functions of a proxy server (proxy server 1) are integrated in the gateway on the end station side, and the master station side deploys a proxy server (proxy server 2) and a gateway on the master station side (GW2, i.e., gateway 2), gateway 1 and proxy server 2 use a TCP socket channel to transfer user data. The end station refers to a ship-mounted mobile device or a vehicle-mounted mobile device in the satellite communication system, and the end station is configured to provide Internet services for user equipments. The master station refers to a ground station device in the satellite communication system and is configured to connect to a website server device providing resources on the Internet.

The user equipment accesses the system, gateway 1 (GW1) allocates an IP address to the user equipment through the DHCP. Gateway 1 notifies proxy server 2 of establishing a TCP socket channel, and simultaneously records a correspondence between an IP of a user and a socket ID of the channel. The user equipment sends an HTTP request, and the communication method of this example may include steps described below.

Step 110, the UE sends the HTTP request, and gateway 1 intercepts the HTTP request and parses contents of the HTTP request.

Step 120, gateway 1 searches a local cache to determine whether the requested resource exists locally. If it exists, step 130 is executed; otherwise, step 140 is executed.

Step 130, gateway 1 returns a local resource to the UE, and the process ends.

Step 140, gateway 1 determines whether a communication channel (a socket channel) corresponding to the user is established according to the IP of the user carried in a message of the HTTP request. If it is not established, step 150 is executed; otherwise, step 160 is executed.

Step 150, gateway 1 establishes a TCP socket channel with proxy server 2, and simultaneously records the correspondence between the IP of the user and the socket ID of the channel.

Step 160, gateway 1 forwards the HTTP request of the user equipment to proxy server 2 through the established socket channel.

Step 170, after receiving the HTTP request, proxy server 2 searches a local cache to determine whether the requested resource locally exists. If it exists, step 1110 is executed; otherwise, step 180 is executed.

Step 180, proxy server 2 requests the resource from a target website through the gateway 2 (GW2) according to the HTTP request.

Step 190, after receiving the resources returned by the target website, proxy server 2 determines whether to perform a compression processing on the resource according to a user configuration. If the compression processing is performed on the resource, step 1100 is executed; otherwise, step 1120 is executed.

Step 1100, proxy server 2 performs the compression processing on the resource and then step 1110 is executed.

Step 1110, proxy server 2 forwards the resource to gateway 1 through the established socket channel.

Step 1120, gateway 1 stores the resource locally and sends the resource to the user equipment.

In an embodiment, when the user equipment leaves the system, the gateway 1 deletes the socket channel corresponding to the user equipment. In other embodiments, if multiple user equipments share one socket channel, a user equipment leaves the system may not trigger gateway 1 to delete the socket channel.

Example 3

Figure 10:
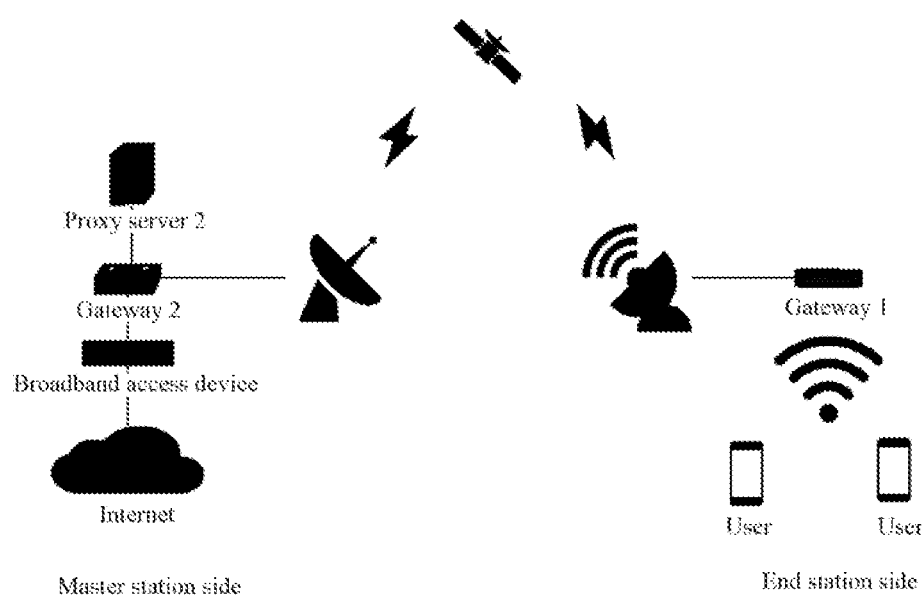
FIG. 10 is a schematic diagram of a satellite communication scenario in embodiment three of the present disclosure.

As shown in FIG. 10, in this example, the end station side deploys a proxy server (proxy server 1) and a gateway on the end station side (GW1, i.e., gateway 1), and the master station side deploys a gateway on the master station side (GW2, i.e., gateway 2), functions of a proxy server (proxy server 2) are integrated in the gateway on the master station side, proxy server 1 and gateway 2 use a TCP socket channel to transfer user data. The end station refers to a ship-mounted mobile device or a vehicle-mounted mobile device in the satellite communication system, and the end station is configured to provide Internet services for user equipments. The master station refers to a ground station device in the satellite communication system and is configured to connect to a website server device providing resources on the Internet.

The user equipment accesses the system, gateway 1 (GW1) allocates an IP address to the user equipment through the DHCP. Gateway 1 notifies proxy server 1 of new user access, proxy server 1 and gateway 2 establishes a TCP socket channel and simultaneously records a correspondence between an IP of a user and a socket ID of the channel.

The user equipment sends an HTTP request, and the communication method of this example may include steps described below.

Step 110, the UE sends the HTTP request, and proxy server 1 intercepts the HTTP request and parses contents of the HTTP request.

Step 120, proxy server 1 searches a local cache to determine whether the requested resource locally exists. If it exists, step 130 is executed; otherwise, step 140 is executed.

Step 130, proxy server 1 returns a local resource to the UE, and the process ends.

Step 140, proxy server 1 determines whether a communication channel (a socket channel) corresponding to the user is established according to the IP of the user carried in a message of the HTTP request. If it is not established, step 150 is executed; otherwise, step 160 is executed.

Step 150, proxy server 1 establishes a TCP socket channel with the gateway 2, and simultaneously records the correspondence between the IP of the user and the socket ID of the channel.

Step 160, proxy server 1 forwards the HTTP request of the UE to the gateway 2 through the established socket channel.

Step 170, after receiving the HTTP request, proxy server 2 searches a local cache to determine whether the requested resource locally exists. If it exists, step 1110 is executed; otherwise, step 180 is executed.

Step 180, gateway 2 requests the resource from a target website through gateway 2 (GW2) according to the HTTP request.

Step 190, after receiving the resources returned by the target website, gateway 2 determines whether to perform a compression processing on the resources according to a user configuration. If the compression processing is performed on the resource, step 1100 is executed; otherwise, step 1120 is executed.

Step 1100, gateway 2 performs the compression processing on the resource and then step 1110 is executed.

Step 1110, gateway 2 forwards the resource to proxy server 1 through the established socket channel.

Step 1120, proxy server 1 stores the resource locally and sends the resource to the user equipment.

In an embodiment, when the user equipment leaves the system, gateway 1 notifies proxy server 1 of deleting the socket channel corresponding to the user equipment. In other embodiments, if multiple user equipments share one socket channel, a user equipment leaves the system may not trigger gateway 1 to notify proxy server 1 of deleting the socket channel.

Example 4

Figure 11:
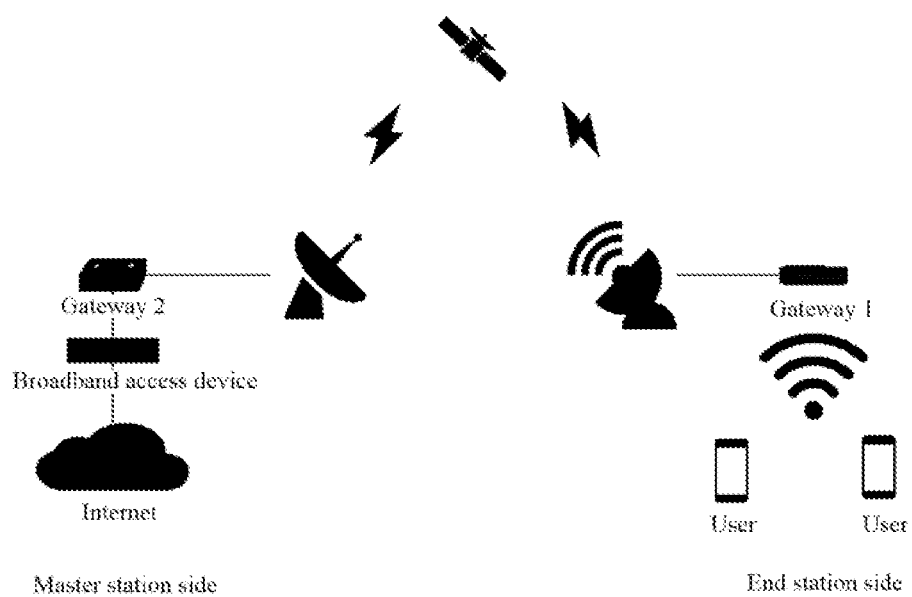
FIG. 11 is a schematic diagram of a satellite communication scenario in embodiment four of the present disclosure.

As shown in FIG. 11, in this example, the end station side deploys a gateway on the end station side (GW1, i.e., gateway 1) and functions of a proxy server (proxy server 1) are integrated in the gateway on the end station side, and the master station side deploys a gateway on the master station side (GW2, i.e., gateway 2) and functions of a proxy server (proxy server 2) are integrated in the gateway on the master station side. A TCP Socket channel is used to transfer user data between gateway 1 and gateway 2. The end station refers to a ship-mounted mobile device or a vehicle-mounted mobile device in the satellite communication system, and the end station is configured to provide Internet services for user equipments. The master station refers to a ground station device in the satellite communication system and is configured to connect to a website server device providing resources on the Internet.

The user equipment accesses the system, gateway 1 (GW1) allocates an IP address to the user equipment through the DHCP. Gateway 1 notifies gateway 2 of establishing a TCP socket channel and simultaneously records a correspondence between an IP of a user and a socket ID of the channel. The user equipment sends an HTTP request, and the communication method of this example may include steps described below.

Step 110, the UE sends the HTTP request, and gateway 1 intercepts the HTTP request and parses contents of the HTTP request.

Step 120, gateway 1 searches a local cache to determine whether the requested resource locally exists. If it exists, step 130 is executed; otherwise, step 140 is executed.

Step 130, gateway 1 returns a local resource to the UE, and the process ends.

Step 140: gateway 1 determines whether a communication channel (a socket channel) corresponding to the user is established according to the IP of the user carried in a message of the HTTP request. If it is not established, step 150 is executed; otherwise, step 160 is executed.

Step 150, gateway 1 establishes a TCP socket channel with gateway 2, and simultaneously records the correspondence between the IP of the user and the socket ID of the channel.

Step 160, gateway 1 forwards the HTTP request of the UE to gateway 2 through the established socket channel.

Step 170, after receiving the HTTP request, proxy server 2 searches a local cache to determine whether the requested resource locally exists. If it exists, step 1110 is executed; otherwise, step 180 is executed.

Step 180, gateway 2 requests the resource from a target website through gateway 2 (GW2) according to the HTTP request.

Step 190, after receiving the resource returned by the target website, gateway 2 determines whether to perform a compression processing on the resource according to a user configuration. If the compression processing is performed on the resource, step 1100 is executed; otherwise, step 1120 is executed.

Step 1100, gateway 2 performs the compression processing on the resource and then step 1110 is executed.

Step 1110, gateway 2 forwards the resource to gateway 1 through the established socket channel.

Step 1120, gateway 1 stores the resource locally and sends the resource to the user equipment.

In an embodiment, when the user equipment leaves the system, gateway 1 deletes the socket channel corresponding to the user equipment. In other embodiments, if multiple user equipments share one socket channel, a user equipment leaves the system may not trigger gateway 1 to delete the socket channel.

Example 5

As shown in FIG. 8, in this example, the end station side deploys a proxy server on the end station side (proxy server 1) and a gateway on the end station side (GW1, i.e., gateway 1), and the master station side deploys a proxy server on the master station side (proxy server 2) and a gateway on the master station side (GW2, i.e., gateway 2), proxy server 1 and proxy server 2 use a stream control transmission protocol (SCTP) socket channel to transfer user data. The end station refers to a ship-mounted mobile device or a vehicle-mounted mobile device in the satellite communication system, and the end station is configured to provide Internet services for user equipments. The master station refers to a ground station device in the satellite communication system and is configured to connect to a website server device providing resources on the Internet.

The user equipment accesses the system, gateway 1 (GW1) allocates an IP address to the user equipment through the DHCP. Gateway 1 notifies proxy server 1 of new user access, proxy server 1 and proxy server 2 establishes an SCTP socket channel and simultaneously records a correspondence between an IP of a user and a socket ID of the channel. The user equipment sends an HTTP request, and the communication method of this example may include steps described below.

Step 110, the UE sends the HTTP request, and proxy server 1 intercepts the HTTP request and parses contents of the HTTP request.

Step 120, proxy server 1 searches a local cache to determine whether the requested resource locally exists. If it exists, step 130 is executed; otherwise, step 140 is executed.

Step 130, proxy server 1 returns a local resource to the UE, and the process ends.

Step 140, proxy server 1 determines whether a communication channel (a socket channel) corresponding to the user is established according to the IP of the user carried in a message of the HTTP request. If it is not established, step 150 is executed; otherwise, step 160 is executed.

Step 150, proxy server 1 establishes a SCTP socket channel with proxy server 2, and simultaneously records the correspondence between the IP of the user and the socket ID of the channel.

Step 160, proxy server 1 forwards the HTTP request of the UE to proxy server 2 through the established socket channel.

Step 170, after receiving the HTTP request, proxy server 2 searches a local cache to determine whether the requested resource locally exists. If it exists, step 1110 is executed; otherwise, step 180 is executed.

Step 180, proxy server 2 requests the resource from a target website through gateway 2 (GW2) according to the HTTP request.

Step 190, after receiving the resource returned by the target website, proxy server 2 determines whether to perform a compression processing on the resource according to a user configuration. If the compression processing is performed on the resource, step 1100 is executed; otherwise, step 1120 is executed.

Step 1100, proxy server 2 performs the compression processing on the resource and then step 1110 is executed.

Step 1110 proxy server 2 forwards the resource to proxy server 1 through the established socket channel.

Step 1120, proxy server 1 stores the resource locally and sends the resource to the user equipment.

In an embodiment, when the user equipment leaves the system, gateway 1 notifies proxy server 1 of deleting the socket channel corresponding to the user equipment. In other embodiments, if multiple user equipments share one socket channel, a user equipment leaves the system may not trigger gateway 1 to notify proxy server 1 of deleting the socket channel.

Compared with the existing art, in the satellite network communication methods, proxy service apparatuses and gateways provided by the embodiments of the present disclosure provide, all resource access requests (such as an HTTP request) initiated by user equipments are transmitted by using a channel established between two proxy service apparatuses, which can spare bandwidth resources consumed during a TCP connection establishment process of each resource access request and improve the user Internet experience.

What is claimed is:

1. A satellite network communication method, applied to a proxy service apparatus on an end station side, comprising:
   establishing for a user equipment a satellite network communication channel between the proxy service apparatus on the end station side and a proxy service apparatus on a master station side;
   intercepting a resource access request sent by the user equipment;
   in a case where a target resource corresponding to the resource access request does not locally exists, acquiring the target resource through the satellite network communication channel and sending the target resource to the user equipment; and
   in a case where the user equipment leaves a satellite network communication system, deleting the satellite network communication channel between the proxy service apparatus on the end station side and the proxy service apparatus on the master station side established for the user equipment according to an indication of a gateway on the end station side.

2. The method of claim 1, wherein establishing for the user equipment the satellite network communication channel between the proxy service apparatus on the end station side and the proxy service apparatus on the master station side comprises one of:
   in a case where a gateway on the end station side accesses the satellite network communication system, establishing for the user equipment the satellite network communication channel between the proxy service apparatus on the end station side and the proxy service apparatus on the master station side according to an indication of the gateway on the end station side, wherein the satellite network communication channel is able to be shared by a plurality of user equipments connected to the gateway on the end station side; or
   in a case where the user equipment accesses the satellite network communication system through a gateway on the end station side, establishing for the user equipment the satellite network communication channel between the proxy service apparatus on the end station side and the proxy service apparatus on the master station side according to the indication of the gateway on the end station side.

3. The method of claim 1, further comprising:
   in a case where the target resource corresponding to the resource access request locally exists, returning to the user equipment the target resource stored locally.

4. The method of claim 1, wherein acquiring the target resource through the satellite network communication channel and sending to the user equipment comprises:
   requesting the target resource from the proxy service apparatus on the master station side through the satellite network communication channel; and
   after receiving the target resource returned by the proxy service apparatus on the master station side, sending the target resource to the user equipment.

5. The method of claim 1, further comprising at least one of:
   after receiving a resource synchronized by the proxy service apparatus on the master station side through a forward broadcast, storing the resource locally; or
   after receiving a target resource corresponding to any resource access request returned by the proxy service apparatus on the master station side, storing the target resource locally.

6. The method of claim 1, wherein
the proxy service apparatus on the end station side is a separate server device or the proxy service apparatus on the end station side is integrated in a gateway on the end station side; and
the proxy service apparatus on the master station side is a separate server device or the proxy service apparatus on the master station side is integrated in a gateway on the master station side.

7. A proxy service apparatus on an end station side, applied for the satellite network communication method of claim 1, comprising: a processor and a storage device storing programs, wherein the programs, when executed by the processor, comprise:
a channel establishment and maintenance module, which is configured to establish for a user equipment a satellite network communication channel between a proxy service apparatus on an end station side and a proxy service apparatus on a master station side;
a message interception module, which is configured to intercept a resource access request sent by the user equipment;
a resource acquisition and processing module, which is configured to acquire a target resource through the satellite network communication channel and send to the user equipment, in a case where the target resource corresponding to the resource access request does not locally exists; and
the channel establishment and maintenance module is configured to delete the satellite network communication channel between the proxy service apparatus on the end station side and the proxy service apparatus on the master station side established for the user equipment according to an indication of a gateway on the end station side in a case where the user equipment leaves a satellite network communication system.

8. A non-transitory computer-readable storage medium, configured to store a satellite network communication program, which, when executed by a processor, implements the satellite network communication method of claim 1.

9. A satellite network communication method, applied to a gateway on an end station side, comprising:
allocating an Internet protocol (IP) address to a user equipment in a case where the user equipment accesses a satellite network communication system;
notifying a proxy service apparatus on the end station side of establishing for the user equipment a satellite network communication channel between the proxy service apparatus on the end station side and a proxy service apparatus on a master station side; and
after detecting that the user equipment leaves the satellite network communication system, sending a channel deletion notification message to the proxy service apparatus on the master station side to indicate the proxy service apparatus on the end station side to delete the satellite network communication channel between the proxy service apparatus on the end station side and the proxy service apparatus on the master station side established for the user equipment.

10. The method of claim 9, wherein notifying the proxy service apparatus on the end station side of establishing for the user equipment the satellite network communication channel between the proxy service apparatus on the end station side and the proxy service apparatus on the master station side comprises one of:
after detecting that the gateway on the end station side accesses the satellite network communication system, sending a channel establishment notification message to the proxy service apparatus on the master station side to indicate the proxy service apparatus on the end station side to establish the satellite network communication channel between the proxy service apparatus on the end station side and the proxy service apparatus on the master station side, wherein the satellite network communication channel is able to be shared by a plurality of user equipments connected to the gateway on the end station side; or
after detecting that the user equipment accesses the satellite network communication system, sending the channel establishment notification message to the proxy service apparatus on the master station side to indicate the proxy service apparatus on the end station side to establish for the user equipment the satellite network communication channel between the proxy service apparatus on the end station side and the proxy service apparatus on the master station side.

11. A gateway on an end station side, applied for the satellite network communication method of claim 8, comprising:
a processor and a storage device storing programs, wherein the programs, when executed by the processor, comprise:
an address allocation module, which is configured to allocate an Internet protocol (IP) address to a user equipment in a case where the user equipment accesses a satellite network communication sy stem;
a notification module, which is configured to notify a proxy service apparatus on the end station side of establishing for the user equipment the satellite network communication channel between the proxy service apparatus on the end station side and the proxy service apparatus on a master station side; and
the notification module is configured to after detecting that the user equipment leaves the satellite network communication system, send a channel deletion notification message to the proxy service apparatus on the master station side to indicate the proxy service apparatus on the end station side to delete the satellite network communication channel between the proxy service apparatus on the end station side and the proxy service apparatus on the master station side established for the user equipment.

12. A satellite network communication method, applied to a proxy service apparatus on a master station side, comprising:
establishing for a user equipment a satellite network communication channel between a proxy service apparatus on an end station side and the proxy service apparatus on the master station side;
after receiving a resource access request sent by the proxy service apparatus on the end station side, acquiring a target resource corresponding to the resource access request;
returning the target resource to the proxy service apparatus on the end station side through the satellite network communication channel;
acquiring a hotspot resource periodically, and storing the hotspot resource locally; and
pushing the hotspot resource to the proxy service apparatus on the end station side by using a satellite forward broadcast.

13. The method of claim 12, wherein acquiring the target resource corresponding to the resource access request comprises:
- determining whether the target resource corresponding to the resource access request locally exists;
- in a case where the target resource corresponding to the resource access request locally exists, acquiring the target resource locally; or
- in a case where the target resource corresponding to the resource access request does not locally exist, acquiring the target resource from a target website.

14. The method of claim 13, after acquiring the target resource from the target web site further comprising:
- storing the target resource locally.

15. The method of claim 12, wherein returning the target resource to the proxy service apparatus on the master station side through the satellite network communication channel comprises:
- compressing the target resource according to a configuration of the proxy service apparatus on the master station side.

16. The method of claim 12, wherein returning the target resource to the proxy service apparatus on the master station side through the satellite network communication channel comprises:
- not compressing the target resource according to a configuration of the proxy service apparatus on the master station side.

17. The method of claim 12, wherein
the proxy service apparatus on the end station side is a separate server device or the proxy service apparatus on the end station side is integrated in a gateway on the end station side; and
the proxy service apparatus on the master station side is a separate server device or the proxy service apparatus on the master station side is integrated in a gateway on the master station side.

18. A proxy service apparatus on a master station side, applied for the satellite network communication method of claim 12, comprising: a processor and a storage device storing programs, wherein the programs, when executed by the processor, comprise:
- a channel establishment and maintenance module, which is configured to establish for a user equipment a satellite network communication channel between a proxy service apparatus on an end station side and the proxy service apparatus on the master station side;
- a message receiving and processing module, which is configured to after receiving a resource access request sent by the proxy service apparatus on the end station side, acquire a target resource corresponding to the resource access request;
- a resource sending module, which is configured to return the target resource to the proxy service apparatus on the end station side through the satellite network communication channel;
- the message receiving and processing module is configured to acquire a hotspot resource periodically and store the hotspot resource locally; and
- the resource sending module is configured to push the hotspot resource to the proxy service apparatus on the end station side by using a satellite forward broadcast.

* * * * *